United States Patent Office

3,715,200
Patented Feb. 6, 1973

3,715,200
ELECTRIC ARC FURNACE OPERATION
Frederick R. Archibald, Toronto, Ontario, and Gerald G. Hatch, Islington, Ontario, Canada, assignors to Falconbridge Nickel Mines Limited, Toronto, Ontario, Canada
Filed Feb. 17, 1969, Ser. No. 799,871
Int. Cl. C21c 5/52; C22d 7/04; H05b 11/00
U.S. Cl. 75—10                                                              6 Claims

ABSTRACT OF THE DISCLOSURE

An improved method for continuous melting of particulate material in an electric arc furnace. The particles are rendered as a body free-flowing and substantially non-conductive electrically and a body thereof is established around and in contact with a vertically adjustable electrode and a high voltage arc between the electrode and a molten bath of the material thereby shielding the arc and establishing a confined zone of high temperature in contact with and around the arc. Particles are melted in contact with the arc and continually replaced by others as melting occurs thereby maintaining the body in contact with the arc and maintaining the confined high temperature zone for rapid melting therein. The distribution of power between the arc and bath is controlled to favour release of power in the arc and thereby achieve high throughput of particles per unit area of furnace hearth. The method is particularly advantageous in the recovery of ferronickel from nickeliferous ores of the oxide and silicate types.

CROSS-REFERENCES

Reference is made to copending United States patent application No. 747,144, now abandoned, relating to "Recovery of Ferronickel From Oxidised Ores."

BACKGROUND OF THE INVENTION

This invention relates to the general field of electric arc furnace technology, is more specifically directed to an improved method for the melting of particulate materials, and is particularly directed to recovery of ferronickel from nickeliferous ores of the oxide and silicate types.

Existing electric smelting processes for recovery of metal values from ores are classified in this specification into three broad types referred to as open-arc, submerged-arc and immersed-electrode. A layer of molten metal or matte overlain by a layer of molten slag, and electrically and thermally conductive charges having substantial proportions of conductive reductants such as carbon, ferrosilicon, and the like, are common in existing electric smelting processes, as are low voltages and high currents, although the types of such processes differ in the position of the electrode with respect to the slag, and the method of charging, the nature of the arc, the distribution of power and heat in the furnace, and other features.

In open-arc operations for the treatment of ores the electrode is positioned above the molten bath, an arc is maintained between the electrode and the bath, the material to be treated is charged in a manner specifically to avoid burying the arc and substantially all the power is released in the arc. One of the major disadvantages of this technique is that the roof and upper walls of the furnace are exposed to direct radiation from the arc that results in heat losses and damage to the refractory lining of the furnace. The performance of different electric smelting operations can be compared on the basis of the power consumption per unit weight of charge, i.e. kwh./ton, on the power density per unit area of hearth, i.e. kw./sq. ft., and on the furnace throughput or output per unit area of hearth per unit time, i.e., tons/sq. ft./hr. In one open arc process for melting of oxidized nickel ore, for example, the power consumption is about 680 kwh./ton, the power density is about 36 kw./sq. ft. and the furnace output is about 0.05 ton/sq. ft./hr. Thus while the power density and output are relatively high the power losses characteristic of open arc practice are reflected by the high power consumption.

In submerged-arc smelting, characteristic of some pig iron operations and processes for making ferro-alloys such as ferrosilicon, the electrode tip is submerged in charge which contains carbon or other reductants that render it electrically conductive and part of the current is therefore passed between the electrodes through the charge in proportion to its conductivity.

A major disadvantage of submerged-arc practice is the sensitivity of the operation to changes in the conductivity of the charge resulting, for example, from changes in the proportions and/or distribution of the various types of particles comprising it. When charge conductivity increases, for example, the electrodes must be raised to maintain voltage drop and power input, and as a result the reaction zone is also raised thereby changing the distribution of heat and the temperature gradients throughout the furnace, with possible deleterious effects, such as freezing of the bath. Thus charge conductivity must be controlled to minimize fluctuations and this in turn means diligent attention to preparation of the charge mixture. Furthermore, the smelting reactions generate hot gases that at the very least are difficult to handle and often cause eruptions and explosions if the gases are denied free passage through the charge for any reason such as blockage of interstitial spaces between larger particles by fines. Thus particle size must be controlled to minimize fines. In some cases also the fusion and sintering that occur in the charge as a result of the smelting reactions can cause bridging of the particles and necessitate poking to maintain supply of charge to the reaction zone. In other cases in which a high proportion of the power is released in the bath, it is necessary to limit the power density to avoid overheating the bath and as a result furnace output is relatively low. For example, in one submerged arc smelting process for recovery of ferronickel from oxidized nickel are in which nearly three quarters of the power input is released in the slag, the power consumption is about 550 kwh./ton, substantially less than the 680 kwh./ton consumed in the open-arc melting operation referred to above, but the power density is only about 10.5 kw./sq. ft. and the furnace output is consequently less than 0.02 ton/sq. ft./hr.

In immersed electrode smelting, the electrode tip is below the surface of the slag and there is therefore no arc at all in the usual sense. The material to be smelted is either side- or centre-charged and substantially all the power is released in the bath. The absence of a relatively resistive arc precludes high voltage operation and immersed electrode practice, like submerged-arc operations, is therefore characterized by low voltages and correspondingly high currents. As a result power input must be severely limited and/or water-cooling provided to minimize refractory attack by the slag. Furthermore, since heat transfer between the electrodes and the charge is effected only indirectly by conduction through the bath, it is highly inefficient. Thus heat is inefficiently utilized and furnace output is again low, as is generally true of most existing electric smelting procedures.

Thus existing electric smelting operations are in general subject to the disadvantages either of limited power input and relatively low furnace output or of inefficient utilization of the heat generated in the furnace thereby resulting in high power consumption, heat losses and damage to the refractory linings of the roof and walls.

We have now developed a new type of electric arc furnace operation in which efficient use is made of the heat generated therein for rapid melting of the charge thereby achieving relatively high furnace output with relatively low power consumption compared to existing processes for the treatment of similar materials and avoiding the heat losses, refractory damage, and other disadvantages of existing techniques in general. The present invention is referred to throughout this specification as shielded-arc furnace operation to distinguish it from the other types decribed above. For the purposes of this specification the words particles and particulate will be understood to refer both to individual particles such as ore particles up to ¼ or ½ inch in size or so and to agglomerates of particles such as briquettes, pellets and pieces thereof.

SUMMARY

In essence the invention comprises rendering the particulate material as a body free-flowing and substantially non-conductive electrically, establishing an arc between a vertically adjustable electrode and a molten bath of the material, establishing a body of the particles around and in contact with the electrode and the arc thereby shielding the arc and establishing a confined melting zone of high temperature in contact with and around the arc, rapidly melting particles in contact with the arc and continually replacing the melted material with other material in the body thereby maintaining contact of the body with the arc and efficiently utilizing the heat of the arc for rapid melting of the material in the confined zone, removing melted material from the bath and supplying fresh particles to the body substantially as melting occurs. The distribution of power in the furnace is advantageously controlled to favour release of power and generation of heat in the arc for melting by maintaining the bath relatively shallow, the voltage of the power supply relatively high and adjusting the electrode to maintain a high resistance, high voltage, stable arc in which heat is generated at high rates and utilized efficiently for melting thereby achieving throughput factors heretofore unrealized.

The invention is particularly useful in the recovery of ferronickel from pre-reduced nickeliferous ores of the oxide and silicate types but is also applicable to the melting of ores, mixtures of metallic and non-metallic materials, fluxes and slag-making constituents, and in general particulate material that as a body is free-flowing and substantially non-conductive electrically.

Thus the principal object of this invention is to provide an improved method for the continuous melting of particulate material in an electric arc furnace.

It is a particular object to provide an improved method for the recovery of ferronickel from nickeliferous ores of the oxide and silicate types. It is a further object to provide an electric arc melting process in which the power released and heat generated in the furnace is efficiently utilized for melting and high furnace outputs are achieved with relatively low power consumption.

Other objects and advantages of the invention will become clear in the more detailed description that follows.

DESCRIPTION OF THE PREFERRED EMBODIMENT

Figure 1:
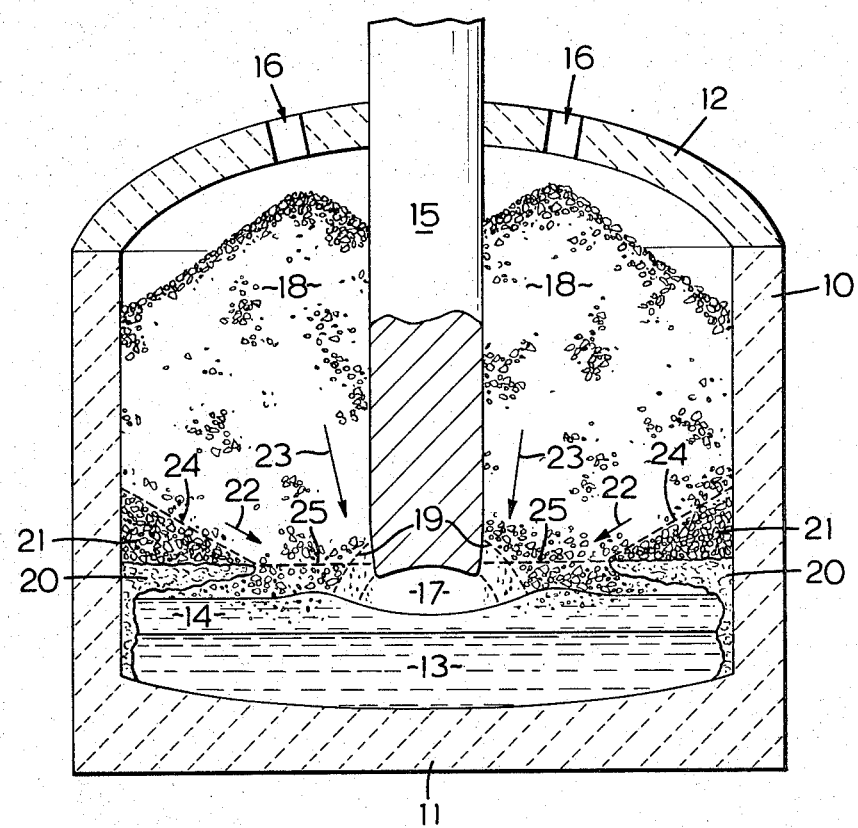
FIG. 1 is a schematic sectional view in elevation through an electric arc furnace and an electrode therein illustrating the principal features of the invention as applied to the recovery of ferronickel from nickeliferous ores of the oxide and silicate types.

Referring first to FIG. 1, a furnace in which the method of the invention may be carried out having refractory-lined walls 10, hearth 11 and roof 12 is shown. Resting on the hearth 11 is a layer of molten ferronickel 13 overlain by a layer of molten slag 14. A vertically adjustable carbon electrode 15 projects through the roof 12 and is positioned above the slag 14, while the roof contains charge ports 16 for supply to the furnace of prereduced nickeliferous ore particles of the oxide and silicate types. During the operation an arc 17 is established between the electrode and the slag, the prereduced nickeliferous particles are supplied through the ports 16 under a neutral or protective atmosphere and a body of particles 18 is established that surrounds and is in contact with the electrode and the arc. Particles flow freely toward the arc and melt in contact therewith substantially without the generation of gases and are continuously replaced by other particles in the body. Thus the body is maintained in contact with the arc and the heat generated therein is continuously consumed by melting thereby confining a shielded arc melting zone in contact with and around the arc. The extent of this zone depends on a number of factors such as the rate of heat generation in the arc and the specific heat, melting point, thermal conductivity and rate of movement of the particles toward the arc, all of which affect the temperature gradient through the body. The melting zone by definition is that zone in which the temperature is at or above the melting point of the particles and is confined according to the practice of this invention to a relatively restricted region in contact with and around the arc, as suggested by boundary 19. Because of the poor electrical and thermal conductivity of the particles and the continuous contact of the body with the arc the temperature gradients fall steeply away from the arc through the body and as a result accretions of frozen slag and unmelted particles 20 form on the walls and extend toward the electrode as shelves supporting static particles 21 above them. The steeper the temperature gradients the wider the shelves and the lower the proportion of particles that can enter the slag layer without passing through the shielded arc melting zone. A column of particles extends into the slag layer as indicated in FIG. 1 but since the temperatures in the slag are lower than those in the arc it is clear that the melting of the particles in the slag by dissolution therein occurs more slowly than that of the particles in the hotter arc melting zone above the slag. Thus the particles flow faster into the arc zone than into the slag thereby further decreasing the proportion of particles that melt in the slag. This differential flow is indicated by the lengths of arrows 22, 23 that show also the downward and inward direction of flow along the plane of natural repose of the particles as indicated by dotted lines 24. The ferronickel and slag formed upon melting of the particles flow into the slag layer and the ferronickel settles into the ferronickel layer. Slag and ferronickel are removed from their respective layers, but since the volume ratio of production of slag to metal is about 50 to 1, ferronickel is tapped infrequently while slag is skimmed at relatively frequent intervals, if not continuously. Fresh particles are supplied as melting occurs to maintain the body 18. When slag is tapped intermittently the slag level rises as indicated by dotted line 25 and the electrode 15 is raised correspondingly to maintain the arc 17.

It will be appreciated by those familiar with the art of electric arcs that shielding the arc by continuously surrounding it with free-flowing particles results not only in more efficient utilization of heat for melting by elimination of radiation losses but also in higher temperatures in the melting zone compared to those with open arcs. A greater proportion of the electrical energy supplied is therefore utilized as heat for melting and this heat is provided at higher temperatures thereby resulting in faster melting rates and higher furnace outputs relative to power consumption that are common in existing electric smelting methods. Furthermore, the steady supply of particles to the melting zone provides an uninterrupted heat sink thereby ensuring the consumption of heat for melting under controlled conditions and avoiding the uncontrolled and rapid rise in temperature and pressure and the dangerous eruptions that occur in some electric smelting operations when charge does not flow continually through the reaction zone.

Thus the heat generated in the arc is efficiently utilized for rapid melting at high but controlled temperatures thereby achieving high furnace outputs and at the same time avoiding the wasteful dissipation of heat and damage to refractories that are common in existing operations. Furthermore the distribution of power between arc and bath is controlled to favour generation of heat in the arc for melting advantageously according to the invention. Power is released in the arc and bath in proportion to their electrical resistances. Thus for each phase and assuming a power factor of unity:

$$\frac{P_A}{P_B} = \frac{R_A}{R_B} \quad (1)$$

where:

$P_A$ = Arc power
$P_B$ = Bath power
$R_A$ = Arc resistance
$R_B$ = Bath resistance Also, $$P_T = \frac{V_T^2}{R_T} \quad (2)$$

where:

$P_T$ = Phase power
$V_T$ = Phase voltage
$R_T$ = Phase resistance

Furthermore $R_T = R_A + R_B$ (3)

Therefore, substituting (3) in (2) and (2) in (1):

$$\frac{P_A}{P_B} = \frac{V_T^2}{P_T R_B} - 1 \quad (4)$$

Figure 2:
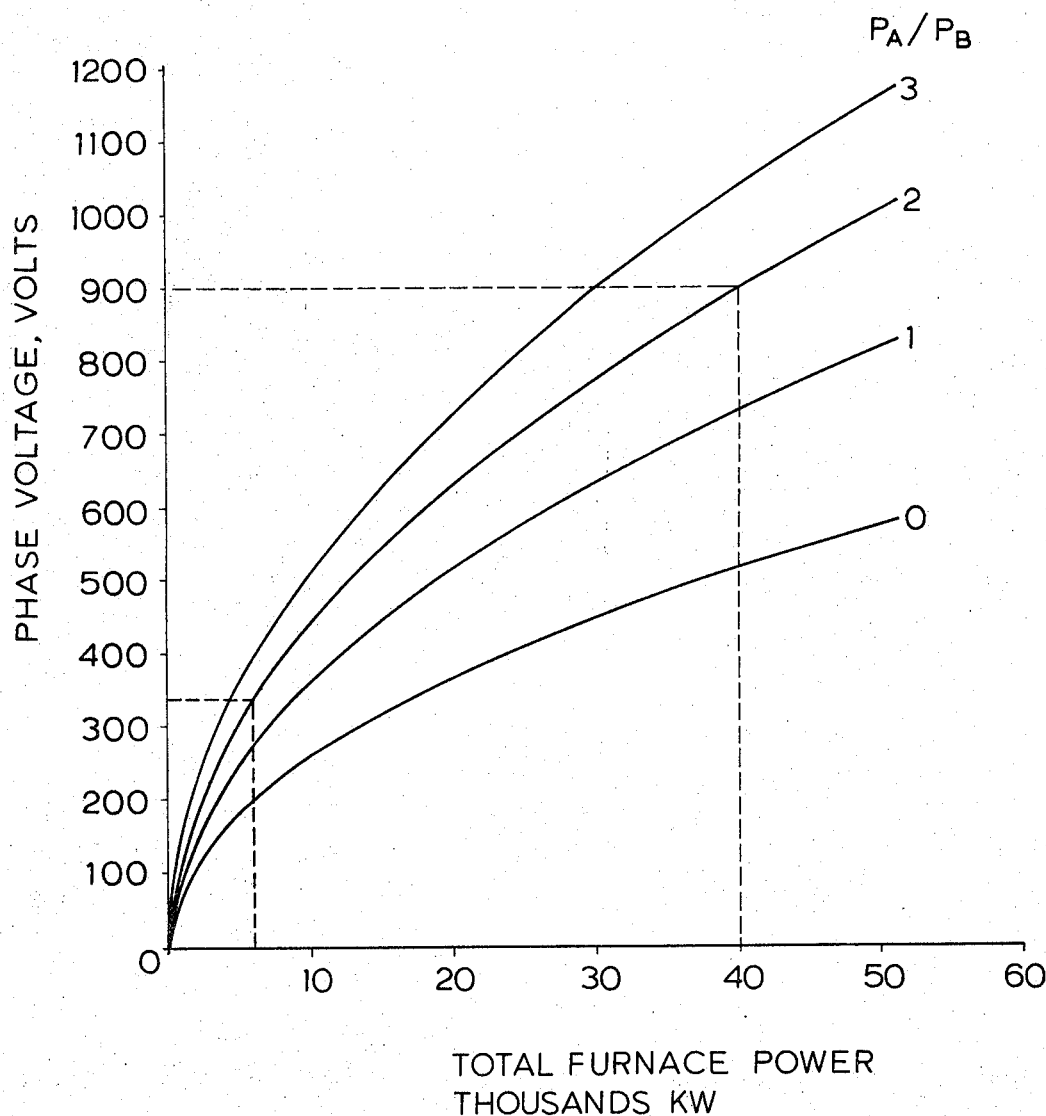
FIG. 2 is a graph showing the relationship between phase voltage and total furnace power under specific conditions as set forth on the graph.

It is clear from Equation 4 that to operate at the highest $P_A/P_B$ ratio, consistent with adequate release of power in the bath to maintain bath temperatures, it is necessary to maximize voltage and minimize bath resistance. Thus in contrast to existing electric smelting operations, the present method is characterized by relatively high voltages and correspondingly low currents. This characteristic is illustrated in FIG. 2 showing phase voltage as a function of total furnace power input for various $P_A/P_B$ ratios in a six-electrodes-in-line, three-single-phase furnace, in which the bath resistance per phase is 0.020 ohm and the power factor is unity. Thus when a total furnace power of 40,000 kw. and a $P_A/P_B$ ratio of two are desired for example, the process is operated at 900 phase volts, markedly greater than the voltages characteristic of existing operations. Also the effect of furnace size is clearly demonstrated. For example, in a relatively small six-in-line pilot-scale furnace which it is desired to operate at a power input of 2000 kw. per phase or a total furnace power of 6000 kw., the indication from FIG. 2 is that a $P_A/P_B$ ratio of two is achieved at a potential of about 350 phase volts. In fact such a furnace is operated at an even higher potential of about 450 phase volts because at the lower power level the bath resistance per phase is greater than the 0.020 ohm on which FIG. 2 is based. Thus even in relatively small pilot-plant scale furnaces operated according to the practice of this invention voltages are unusually high compared to existing electric furnace operations for the tretament of ores, concentrates and the like.

Since bath resistance is increased with bath depth the latter is maintained as shallow as possible in accordance with the teachings of this invention. In the present case the bath consists of a layer of molten ferronickel overlain by a layer of highly resistive molten slag and bath resistance is therefore essentially that of the slag and is determined primarily by slag depth. The minimum depth of slag is limited by mechanical considerations relating to the means for removing slag from the furnace and is approximately one foot or about 30 cm. In other words minimum slag depth is limited by furnace design. Slag and metal tapholes are located at specific levels in the furnace walls and slag depth can be maintained constant at the minimum depth by continuous tapping. Of course slag can also be skimmed intermittently in which case the depth of slag will fluctuate but the corresponding fluctuation in resistance is proportionately less than that of depth because the slag resistance, as measured, includes contact resistances that are substantially independent of slag depth. Furthermore, it has been found that the effect of slag depth on slag resistance decreases as slag depth increases, other conditions remaining constant. This is illustrated in Table 1 for a 2000 kw. per phase pilot operation with 18" diameter electrodes spaced about 4 feet apart and in contact with the surface of the slag.

TABLE 1

Effect of slag depth on slag resistance

| Slag depth, cm.: | Slag resistance, ohm |
|---|---|
| 10 | 0.020 |
| 20 | 0.028 |
| 30 | 0.032 |
| 40 | 0.033 |
| 50 | 0.034 |

Thus it is clear that above the minimum depth of about 30 cm. there is little increase in slag resistance with slag depth.

Therefore, when phase voltage is increased at constant power input, the corresponding increase in resistance per phase, as implied by Equation 2, occurs largely in the arc and is effected by raising the electrode and thereby lengthening the arc. As a result, the $P_A/P_B$ ratio is increased as indicated by Equation 4 and illustrated in FIG. 2. Under such conditions, current is decreased, of course, and so also, therefore, is the voltage drop across the slag. As a result arc voltage is correspondingly increased thereby contributing to the increased $P_A/P_B$ ratio. The voltage tap of the power supply and the arc length are therefore selected and adjusted in relation to one another to provide stable operation at maximum voltage. The only limitations to voltage in practice are the limitations of the electrical circuitry and the requirements for arc stability. Arcs cannot be lengthened indefinitely at any given voltage without becoming unstable and losing their current-carrying capacity. Thus there is a maximum effective arc length at any voltage tap and the maximum voltage is limited in turn by the electrical equipment.

In summary then, the slag layer is maintained as shallow as possible thereby requiring the least amount of power release therein to maintain desired slag and metal temperatures, and voltage and arc length are adjusted in relation to the resulting power input so that the amount of power actually released in the slag, while sufficient to maintain the bulk of the slag and metal at tapping temperatures, is advantageously insufficient to permit molten slag to exist in contact with the refractory walls of the furnace. Temperature gradients are such that the walls are protected by a layer of frozen slag thereby preventing erosion without the need for water cooling. Heat losses are therefore avoided and at the same time the major portion of the power is released in the arc for generation of heat therein that is utilized efficiently for rapid melting of particles at high temperatures in the shielded arc melting zone.

As shown by Equation 2 the power input is fixed by the voltage of the power supply and the resistance of the furnace, that is to say, the sum of the arc and bath resistances. Since at least as much power is released in the arc as in the bath according to the practice of this invention it is clear that the total resistance must be at least twice the bath resistance. Bath resistances that can be regarded as indicative of highly resistive slags are in the range of at least about 0.01 to about 0.04 ohm and are to some extent dependent on furnace size. That is to say a bath resistance of 0.035 ohm in a small furnace of a few thousand kilowatts might correspond to a resistance of only 0.015 or 0.020 ohm in a larger furnace of say 40,000 kw. as a result of the effect of the larger diameter electrodes and the higher power level in decreasing effective slag resistance. Thus in a small single phase furnace in which bath resistance is 0.035 ohm, for example, the total resistance would be at least 0.07 ohm and the potential required to generate say 2000 kw. would therefore be at least about 375 volts, as calculated from Equation 2, and higher the higher the proportion of the power that is released in the arc, as shown in FIG. 2. In a relatively large 3-phase furnace, on the other hand, in which bath resistance is say 0.020 ohm, total resistance is at least 0.04 ohm and the potential to generate say 15,000 kw. per phase is at least about 775 phase volts. To release twice as much power in the arc as in the bath the electrode is raised, the arc lengthened to increase arc resistance to 0.04 ohm and the potential of the power supply is increased to about 950 volts.

Such high voltages are heretofore unknown in the art of electric arc smelting practice and are possible according to the present invention because the arc is shielded and in substantially continuous contact with the free-flowing electrically nonconductive charge, and power distribution is controlled to limit power release in the slag and avoid overheating while the majority of power is released in the arc. Under these conditions relatively large power inputs are supplied to the furnace and the heat generated in the arc is efficiently consumed for rapid melting of the charge in the confined shielded arc melting zone in contact with and around the arc. The uninterrupted heat sink provided by the free-flowing charge ensures consumption of the large arc heat output as it is generated thereby not only resulting in high melting rates and furnace output but also at the same time preventing the rapid uncontrolled and hazardous increase in temperature that would occur were the flow of charge interrupted.

In the present context the particles being melted are considered to be free-flowing if the body thereof is in substantially continuous contact with the arc. It is reasonable to expect that, as particles begin to melt, bridging or crusting might occur from time to time near the outer extremities of the melting zone, but downward movement of the particles is maintained by the weight of the body itself. The particles melt advantageously within a relatively narrow range of temperatures in the well-defined melting zone while fusion and sintering outside the zone is insufficient to prevent substantially continuous downward movement of the body and contact with the arc.

The term, substantially non-conductive electrically, means simply that the electrical properties of the body are such that the power is released in the arc and molten bath substantially without shorting of power between electrodes through the body. Thus individual particles in the body can differ widely in their electrical conductivities so long as the body is substantially non-conductive. The reduced material described above, for example, contains metallic particles that are highly conductive electrically but a much higher proportion is non-conductive slag-making particles and the overall electrical conductivity of a body of these particles is therefore negligible. While it is melted in the absence of added carbon it should be understood that carbon could be added if desired so long as the resulting body remained substantially non-conductive. What must be avoided is a continuous series of electrically conductive particles in contact between the electrodes in which current can flow through the solid charge.

Ores, concentrates, fluxes and the like that are substantially non-conductive electrically are also poor thermal conductors and this is especially true of a body of these materials in particulate form since conduction of heat is dependent on point contact between particles regardless of their individual thermal conductivities. Thus porous materials such as briquettes, pellets and pieces thereof are particularly desirable as is the case with the reduced nickeliferous ore described above.

The phrase, neutral or protective, as applied to the atmospheres under which the reduced nickeliferous ores as described are to be treated, relates to atmospheres in which substantially no oxidation or reduction of the ore is effected.

Having defined what is meant by the terms used herein to describe the necessary properties of a body of particulate material for melting according to the present invention, it will be appreciated that in addition to the pre-reduced nickeliferous ore described, there are other materials to which the invention is applicable. Thus unreduced oxidized nickel ores can be melted advantageously in an agglomerated, anhydrous form, and under oxidizing conditions to prevent reducing reactions that could cause sintering and destroy the free-flowing nature of the unreacted ore particles. The method can also be applied to the recovery of metal from particles containing metallics that as a body are electrically conductive, if sufficient non conductive slag-making particles are present in the body to render it non-conductive. Thus ore concentrate particles that in reduced form contain sufficient metal to render a body of the particles conductive can be melted advantageously under a protective atmosphere according to this invention in the presence of selected slag-making particles that serve also to control the composition of the resulting metal product. Slag-making particles that are free-flowing and non-conductive in admixture with metallics can also be melted on their own, if desired, although the more likely application of the method is the recovery of metals from ores, concentrates and the like.

To emphasize further the features of the present invention the procedure for starting up a furnace for operation according to the invention is described. In the treatment of oxidized nickel ores for the recovery of nickel as ferronickel, for example, the ore is prereduced as described above, thereby avoiding the need for the addition of carbon or any other electrically conductive reductants to the ore in the electric furnace thereby rendering the ore electrically non-conductive. A layer of molten iron or ferronickel overlain by a layer of molten slag is established in the furnace conveniently by operating according to common electric furnace practice at relatively low voltage, and power input. Operation according to the existing practice might be continued, with the tip of the electrode immersed in the slag or slightly above, in a manner exemplified by example 2, following. However, by a sequence of operating steps the furnace may be brought to a much higher level of performance in accordance with the specification and advantages of the present invention as illustrated by Example 1.

The first step is to ensure that the slag bath, including the area about the tip of the electrode is covered with charge of the kind described. The electrode is then raised a small distance above the slag and the voltage simultaneously adjusted to establish and maintain a stable arc under the new conditions of greater arc length, resistance, and power input. Prereduced ore is supplied to the furnace around the arc to consume the additional heat generated in the arc and the voltage of the power supply is again raised to stabilize the arc and further increase the power input. The length of the arc and the voltage are increased in relation to one another to maintain the arc stable as more and more heat is generated therein and the rate of addition of ore to the furnace is increased steadily beyond the melting rate thereby establishing a substantial body of ore around and in contact with the electrode and the arc and effectively shielding the arc. Because the ore is substantially non-conductive electrically, virtually no power is released therein and thus a confined zone is established in contact with and around the arc in which melting occurs efficiently by radiation from the shielded arc. The melted material is continually replaced by other free-flowing material in the body thereby maintaining the body as an uninterrupted heat sink in contact with the arc, sustaining the confined melting zone and effecting melting at temperatures higher than those which exist with open arcs but lower than the uncontrolled and undesirably high temperatures that are sometimes established in existing submerged arc smelting furnaces when charge flow is interrupted. The voltage of the power supply is ultimately increased beyond that which would be possible were the charge electrically conductive and with the correspondingly high arc resistance the rate of power release and heat generation in the arc are likewise relatively high. The melted material is removed from the furnace and the depth of the slag controlled advantageously to the minimum thereby minimizing not only the amount of heat required to maintain the slag and ferronickel at temperature but also the proportion of the total power input that is released in the slag. Thus as large a proportion of the power as possible is released in the shielded arc and the resulting rate of heat generation is so great that the furnace outputs resulting from the efficient utilization of this heat for melting according to the present invention are higher than those achieved heretofore.

The advantages of the invention are emphasized by reference to the following examples.

EXAMPLE 1

The refractory-lined, closed single phase electric arc furnace with internal dimensions of about 12 feet in length, 7.5 feet in width, and 7 feet in depth, was equipped with two 18" diameter electrodes spaced about 4 feet apart. A metal taphole was set in one end of the furnace at the surface of the hearth, and two slag tapholes in the other end of the furnace were set 16.5 inches above the hearth.

The charge was reduced nickeliferous ore from the shaft furnace process described in the aforementioned United States patent application No. 747,144 with a particle size of about 50% $-2''+1''$ and 50% $-1''+\frac{1}{4}''$, a bulk density of about 80 lb./cu. ft., and the following chemical analysis in weight percent: Fe, 20.0; Ni, 1.88; MgO, 29; $SiO_2$, 30; C, .03; S, .01.

This porous, free-flowing poorly conducting material was fed at a temperature between about 750 and 800° C. under the protective shaft furnace atmosphere through the roof of the furnace and was piled around and against the electrodes to maintain a depth of about 5 feet. After formation of a layer of molten ferronickel superposed by a layer of molten slag steady operating conditions were established at a voltage of 440 phase volts and an arc length of about 3 inches, thereby resulting in a power input rate of 2000 kw. at a current of 4600 amps and a power factor of 0.99. Slag was tapped through the slag tapholes intermittently at a temperature of about 1650° C. and an overall rate of about 4.3 tons/hr., while ferronickel, which accumulated at less than $\frac{1}{50}$th the volume rate of slag, was tapped as required at a temperature of about 1530° C. Slag depth fluctuated between about 12 and 20 inches while ferronickel depth was substantially constant at about 4 inches. Composition of the product ferronickel in weight percent was: Fe, 56.4; Ni, 42.2; Co, 1.0; S, 0.04; C, 0.007; Si, <.01; Mn, 0.0007; P, 0.01; Cr, 0.007.

After operation in this manner for a period of several weeks the power was shut off, molten slag and metal layers were drained, the furnace was cooled, and then opened for examination. Banks of frozen slag and unmelted charge were suspended from the walls of the furnace and the walls were covered by a layer of frozen slag as shown in FIG. 1. Substantially no erosion of the refractory walls was noted except around the slag tapholes in spite of the fact that no cooling was done of the furnace shell by water or any other special means except around the water-cooled tapholes and there was no damage to the refractory lining of the furnace roof. The electrodes, with negligible consumption of about 2 lb./ton charge, were scarcely tapered and had regular concavities across their bottom ends as shown in FIG. 1.

Total slag resistance varied between about 0.035 and 0.040 ohm from which it was determined that total arc resistance was about 0.06 ohm and arc power to slag power ratio was about 1.7. Furthermore, since charge rate was about 4.5 tons per hour, the furnace output was 0.05 ton/hr./sq. ft. of furnace hearth area. Power consumption was only about 450 kwh./ton while nominal power density was about 22.5 kw./sq. ft. of total hearth area.

Since the particulate material was rendered electrically non-conductive, all the current was passed through the slag and since the slag itself was highly resistive it would be expected, on the basis of existing art, that a major proportion of the power would be released in the slag. It is clear from this example, however, that only 37% of the power was released in the slag at a power density of about 8.3 kw./ft.$^2$, while the major portion of the power, 63% was released in the arc. The condition that distinguishes the present operation from existing electric smelting processes is the combination of a highly resistive molten slag with a highly resistive solid charge as a deep body around and in contact with the electrode. It is expected that many of those familiar with the operation of electric arc furnaces would wonder how, under such a condition, an arc would be maintained at all, and how release of a major portion of the power in the slag could be avoided together with the attendant disadvantages of power losses, refractory attack and water cooling. The answer, according to the teachings of this invention is that a stable arc is maintained by applying relatively high voltages and shielding the arc as described thereby maintaining the level of temperature and ionization necessary to sustain current flow through the arc plasma. Voltages are so high that a majority of the power is released in the arc and the heat generated thereby is efficiently utilized for melting in the relatively confined melting zone in contact with and around the shielded arc, while not more than 10 kw./ft.$^2$ at the most is released in the slag thereby precluding the need for water cooling and substantially eliminating unnecessary power losses and damage to refractories.

The same basic mode of operation has been practised in the same furnace under a variety of conditions with similar success. Thus, voltage has been varied between about 300 and 800 volts, power input between about 1,000 and 2,000 kw., slag depths between about 1 and 2 feet, and electrode diameters between about 9 and 18 inches with both continuous as well as intermittent tapping of slag. Commercial operation at power inputs up to about 50,000 kw. with electrodes up to about 45 inches in diameter and voltages up to about 1200 volts are contemplated. As discussed above there is no limitation on voltage except the requirements of arc stability and external electrical equipment. In one test at about 2000 kw. and 800 volts in the furnace described in Example 1, the operation was unstable and it is thought this was because the arc length under these conditions was too great for stable conduction of current through the arc plasma between the electrode and the slag. This condition can be eliminated by injection directly into the arc of ionizable material, advantageously readily ionizable gas such as a hydrocarbon, preferably methane or propane, to increase the current carrying capacity and consequently the stability of the arc. With the larger currents in commercial furnaces stable arcs can be more readily achieved at higher voltages than in smaller scale pilot plant furnaces with smaller currents.

EXAMPLE 2

Similar material to that described in Example 1 was melted according to open-arc practice in a closed circular electric furnace of about 11 feet internal diameter equipped with 3 electrodes arranged triangularly in the centre of the furnace. Short open arcs were maintained between the electrodes and the slag and the material was charged to the walls of the furnace and flowed down charge banks into the hot arc zone. Power input was 500 kw. and material was treated at the rate of about one ton per hour. Thus the throughput rate per unit area of hearth was only about 0.01 ton/sq. ft./hr. or about 1/5th of the unit production rate of the present invention as indicated by Example 1.

Thus an improved method of operating an electric arc furnace is provided for the melting of particulate material that as a body is rendered free-flowing and substantially non-conductive electrically by which heat is utilized efficiently for melting at high temperatures and consequent high rates in a confined shielded arc melting zone above the slag, thereby achieving unusually high furnace outputs and at the same time avoiding heat losses and damage to the refractory linings of the furnace substantially without the need for waetr cooling of the furnace shell.

What we claim as our invention is:

1. In a method for continuously melting particulate material containing metal values and slag-making constituents by establishing in an electric arc furnace having a vertically adjustable non-consumable electrode and a source of power at variable voltage, a molten bath resulting from the melting of particles of the material in a mixture thereof overlying the molten bath, the improvement comprising,
   (1) positioning the electrode above the bath and establishing an arc between the electrode and the bath,
   (2) enveloping and enclosing the arc by the mixture overlying the bath, thereby establishing a shielded arc and an improved heat transfer system,
   (3) continually melting particles in an arc melting zone in and adjacent surrounding the shielded arc,
   (4) maintaining particles in and about the melting zone, by limiting the amount of any electrically conductive particles relative to the amount of non-conductive slag-making constituents in the material so that the overall electrical conductivity of the mixture of the particles as a whole is negligible, whereby the power is released in the arc and molten bath substantially without shorting of the power through the mixture, and material in the mixture moves continually by gravity into and through the melting zone as melting occurs,
   (5) adjusting the length of the arc and the voltage of the power supply to establish a high voltage drop across the arc such that a major portion of the power supplied to the furnace is released in the shielded arc and a minor portion, sufficient to maintain the bath molten and at desired temperature, is released in the bath, thereby effecting a majority of the melting in the furnace rapidly above the bath by radiation from the shielded arc rather than by dissolution in the relatively cold molten bath,
   (6) removing melted material from the bath, and
   (7) feeding particulate material to the mixture as melting occurs.

2. A method according to claim 1 comprising maintaining the depth of the bath between about 1 and 2 feet.

3. A method according to claim 1 comprising adjusting the length of the arc so that the total resistance per phase is at least about 0.02 ohm.

4. A method according to claim 1 in which the particulate material is reduced nickeliferous ore of the oxide and silicate types, the furnace is closed, the particles are supplied and treated under a neutral or protective atmosphere, the bath is a layer of molten ferronickel overlain by a layer of molten slag and both slag and metal are removed from their respective layers.

5. A method according to claim 1 in which the particulate material is substantially anhydrous nickeliferous ore of the oxide and silicate types.

6. A method according to claim 1 comprising supplying gas to the arc to enhance arc stability.

References Cited

UNITED STATES PATENTS

| | | | |
|---|---|---|---|
| 2,805,930 | 9/1957 | Udx | 75—11 |
| 3,150,958 | 9/1964 | Collin | 75—34 |
| 2,974,032 | 3/1961 | Grunert | 75—10 |
| 2,775,518 | 12/1956 | Udx | 75—11 |
| 1,873,800 | 8/1932 | Wejnarth | 75—10 |
| 2,523,092 | 9/1950 | Bryk | 75—11 |
| 2,794,843 | 6/1957 | Sem | 75—10 |
| 3,150,961 | 9/1964 | Collin | 75—11 |
| 3,180,916 | 4/1965 | Menegoz | 75—10 |
| 3,385,494 | 5/1968 | Themelis | 75—10 |

FOREIGN PATENTS

| | | | |
|---|---|---|---|
| 88,565 | 1/1957 | Norway | 75—10 |

CHARLES N. LOVELL, Primary Examiner

P. D. ROSENBERG, Assistant Examiner

U.S. Cl. X.R.

13—33; 75—11, 82